(12) United States Patent
Mori et al.

(10) Patent No.: US 7,447,884 B2
(45) Date of Patent: Nov. 4, 2008

(54) MULTI-TABLE BRANCH PREDICTION CIRCUIT FOR PREDICTING A BRANCH'S TARGET ADDRESS BASED ON THE BRANCH'S DELAY SLOT INSTRUCTION ADDRESS

(75) Inventors: Junji Mori, Yokohama (JP); Harutaka Goto, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 10/134,629

(22) Filed: Apr. 30, 2002

(65) Prior Publication Data

US 2003/0172259 A1  Sep. 11, 2003

(30) Foreign Application Priority Data

Mar. 6, 2002  (JP)  ............................. 2002-060952

(51) Int. Cl.
   *G06F 9/00* (2006.01)
(52) U.S. Cl. ..................................................... 712/239
(58) Field of Classification Search ................ 712/238, 712/239, 233, 234, 237, 240; 711/122, 133
   See application file for complete search history.

(56) References Cited

U.S. PATENT DOCUMENTS

| 5,504,870 | A | * | 4/1996 | Mori et al. | ................... | 712/238 |
| 5,506,976 | A | * | 4/1996 | Jaggar | ........................ | 712/238 |
| 5,511,175 | A | * | 4/1996 | Favor et al. | ................... | 712/216 |
| 5,515,518 | A | * | 5/1996 | Stiles et al. | ................... | 712/239 |
| 6,178,498 | B1 | * | 1/2001 | Sharangpani et al. | ....... | 712/239 |
| 6,199,143 | B1 | * | 3/2001 | Segal | .......................... | 711/120 |
| 6,732,260 | B1 | * | 5/2004 | Wang et al. | ................. | 712/237 |

FOREIGN PATENT DOCUMENTS

JP  4-321130  11/1992

OTHER PUBLICATIONS

Hennessy, John and Patterson, David. Computer Organization and Design, 2nd Ed.. Morgan Kaufmann Publishers, Inc., 1998.*
Hennessy, John and Patterson, David. Computer Architecture, A Quantitative Approach, 2nd ed.. Morgan Kaufmann Publishers, Inc. 1996.*
The Authoritative Dictionary Of IEEE Standards Terms, 7th Ed., 2000, p. 874.*

* cited by examiner

*Primary Examiner*—David J Huisman
(74) *Attorney, Agent, or Firm*—Oblon, Spivak, McClelland, Maier & Neustadt, P.C.

(57) ABSTRACT

A first storage unit stores an address of a branching instruction and a branched address. A first detector detects whether or not an instruction of the present address has previously been branched from an output of the first storage unit. When the first detector detects previous branching of the instruction of the present address, the second storage unit stores the branched address corresponding to the address of the instruction to be executed following the branching instruction. When a second detector detects an output of a program counter as the address of the instruction to be executed following the branching instruction, the second storage unit outputs the branched address.

20 Claims, 5 Drawing Sheets

MULTI-TABLE BRANCH PREDICTION CIRCUIT FOR PREDICTING A BRANCH'S TARGET ADDRESS BASED ON THE BRANCH'S DELAY SLOT INSTRUCTION ADDRESS

CROSS-REFERENCE TO RELATED APPLICATIONS

This application is based upon and claims the benefit of priority from the prior Japanese Patent Application No. 2002-060952, filed Mar. 6, 2002, the entire contents of which are incorporated herein by reference.

BACKGROUND OF THE INVENTION

1. Field of the Invention

The present invention relates to a branch prediction circuit of a microprocessor for executing, for example, pipeline processing.

2. Description of the Related Art

In a microprocessor for performing pipeline processing, a branching instruction which changes the flow disturbs the pipeline processing. Therefore, an ineffective cycle is generated, and this degrades capabilities. Particularly, a microprocessor whose operation frequency exceeds a GHz has a multilayered pipeline. Therefore, in the microprocessor, ten or more cycles are required from when the instruction is fetched and recognized as the branching instruction until a branched address is calculated.

FIG. 5 shows an operation in the microprocessor having an initial multilayered pipeline during the branching instruction generation. This processor requires, for example, eleven cycles until the instruction is recognized as the branching instruction after the instruction is fetched. This invalidates a plurality of subsequent instructions which have entered the pipeline in and after a delay slot. Therefore, processing efficiency is remarkably degraded. Here, the delay slot is an instruction which is executed immediately after the branching instruction and which is unrelated to the branching instruction. This delay slot is set by a compiler.

In this manner, the processor having the initial multilayered pipeline has many instructions invalidated on and after the branching instruction. In recent years, microprocessors have had a branch prediction circuit in order to reduce the invalidated instructions. The branch prediction circuit is constituted to store a history of previously executed branching instructions beforehand, and to change over the program counter to the previously branched-to address based on the history after the branching instruction is fetched.

For branch prediction, when much previous history is stored, a precise prediction can be achieved. For this, a branch table for storing the history is constituted of a memory which has a large capacity similar to an instruction cache. In this branch table, an address at which the branching instruction is present (hereinafter referred to as the address of the branching instruction) is associated and stored with an address previously branched to from the branching instruction (hereinafter referred to as the branched address). However, when the branch table is constituted of a large-capacity memory, it takes several cycles to access the branch table. Therefore, even when the address of the program counter is the address of the previously executed branching instruction, it requires several cycles to change to the branched address of the branching instruction.

FIG. 6 shows an operation during branch prediction. In this example, the operation includes: accessing the branch table with the address of the branching instruction; and executing a delay cycle while the branch table is accessed. In the case of performing branch prediction in this manner, the address can be changed to the branched address with fewer cycles as compared with a case of not performing the branch prediction. However, even when the branch prediction is performed, several ineffective cycles are generated in and after the delay slot.

Since the initial processor has a low operation frequency, the branched address can be obtained during execution of the delay slot. Control can be switched to the branched address after the delay slot. Therefore, it is possible to remove the ineffective cycles.

However, in recent years, the operation frequency of microprocessors has been raised, and the bus width in which the instruction is read from the memory has increased. Therefore, it is possible to simultaneously read a plurality of instructions in one cycle. For example, when one instruction is 32 bits, and the bus width of the memory is 64 bits, two instructions are read in parallel. Therefore, even when branch prediction is executed, ineffective cycles are generated.

On the other hand, as shown in FIG. 7, for example, when the delay slot makes an instruction cache mistake, the cache needs to be refilled. After the branching instruction is fetched as described above, the branch table is accessed with the address of the branching instruction, and the branched address is read out. When the branched address is read out, and the delay slot makes the instruction cache mistake, it is necessary to hold the branched address read from the branch table while refilling the cache. Thereafter, after the cache is refilled, and the delay slot is re-executed, an operation of changing the address of the program counter to the held branched address is necessary. This control is complicated, and increases circuit scale.

As described above, for a microprocessor which has a wide memory bus width at a high operation frequency, it is difficult to reduce the ineffective cycles by the branching instruction. There has been a demand for a branch prediction circuit which can suppress the ineffective cycles by the branching instruction as much as possible even in a microprocessor having a wide memory bus running at high operation frequency.

BRIEF SUMMARY OF THE INVENTION

According to an aspect of the present invention, there is provided a branch prediction circuit comprising: a program counter to indicate an address of an instruction; a first storage unit to store the address of a branching instruction and a branched address branched to by the branching instruction; a first detection circuit to detect whether or not the same address of the branching instruction as the address of the instruction output from the program counter is present in the first storage unit; a second storage unit to store the address of the instruction executed following the detected branching instruction, and the branched address branched to by the branching instruction, when the first detection circuit detects the address of the branching instruction; and a second detection circuit to detect the branched address corresponding to the address of the instruction to be executed following the branching instruction from the second storage unit, when the address output from the program counter is the address of the instruction to be executed following the branching instruction.

DETAILED DESCRIPTION OF THE INVENTION

An embodiment of the present invention will be described hereinafter with reference to the drawings.

Figure 1:
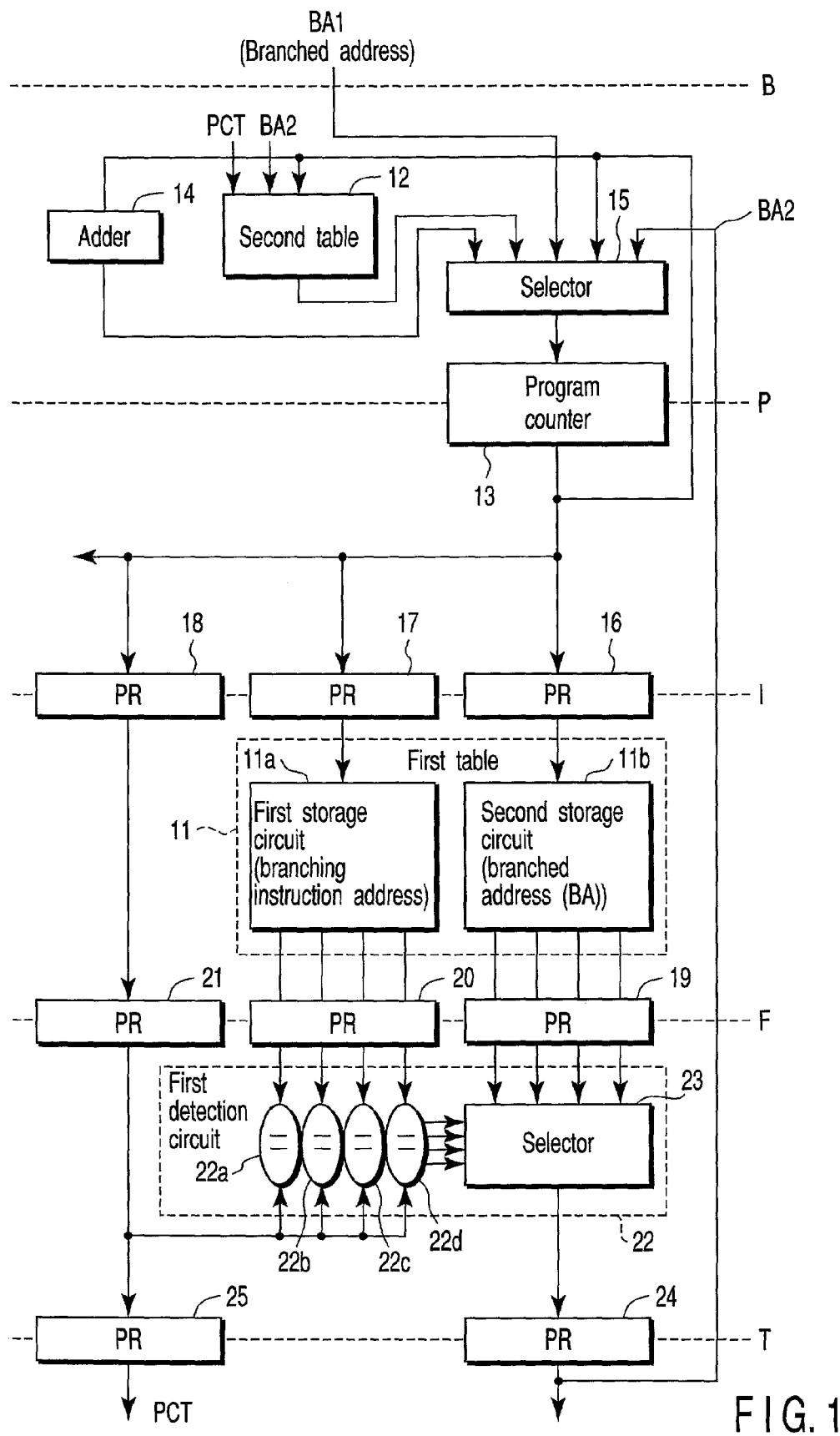
FIG. 1 is a constitution diagram showing a branch prediction circuit according to an embodiment of the present invention.

FIG. 1 shows a branch prediction circuit according to the embodiment of the present invention. The branch prediction circuit has a first table 11 as a first storage unit, and a second table 12 as a second storage un it. The first table 11 is a large-capacity memory which is constituted, for example, of a static RAM (SRAM) and which has, for example, 1024 entries. The second storage unit is a small-capacity and high-speed memory which is constituted, for example, of a flip-flop circuit and which has, for example, about four entries. In FIG. 1, a concrete constitution regarding the writing of information with respect to the first and second tables 11, 12 is omitted.

The branch prediction circuit is constituted of a pipeline which has, for example, five stages B to T. The first stage B is a stage for starting, for example, branch prediction, the second stage P is a program counter, the third stage I is an instruction cache, the fourth stage F is a fetch, and the fifth stage T is a data transfer. Actual calculation and the like are executed in the subsequent stages (not shown).

The second table 12, an adder 14, and a selector 15 are arranged in the first stage B, and a program counter 13 is disposed in the second stage P. An output end of the program counter 13 is connected to an input end of the second table 12. A branched address BA2 predicted as described later and a value PCT of the program counter 13 held by a pipeline register 25 are supplied to the input end of the second table 12. The output ends of the second table 12 and adder 14 are connected to the input end of the selector 15. The adder 14 renews the address of the program counter 13 in accordance with the number of simultaneously issued instructions. For example, when two instructions are issued at the same time, the adder 14 adds "+2" to the address of the program counter 13. Furthermore, a branched address BA1 of the branching instruction and the predicted branched address BA2 are supplied to the input end of the selector 15. The address output from the selector 15 is supplied to the program counter 13. The same address is set in the program counter 13.

The output end of the program counter 13 is connected to the input ends of pipeline registers (PR) 16, 17, 18 disposed in the third stage I. The embodiment will further be described hereinafter in which a mapping system of the first table 11 for performing the branch prediction is, for example, a 4-way set associative system. However, the mapping system of the first table 11 is not limited to the set associative system, and other systems such as a full associative system can also be applied.

The output ends of the PRs 17, 16 are connected to the input ends of first and second storage circuits 11a, 11b constituted, for example, of SRAMs constituting the first table 11. The first table 11, comparators 22a to 22d as a first detection circuit described later, and selector 23 constitute a 4-way set associative memory. In the 4-way set associative memory, the first storage circuit 11a stores a part of the address of the branching instruction supplied from the program counter 13 as a tag. The second storage circuit 11b stores the branched address corresponding to the branching instruction as data in accordance with another part of the address of the branching instruction supplied from the program counter 13. The output ends of the first and second storage circuits 11a, 11b are connected to PRs 20, 19 of the fourth stage. Moreover, the output end of the PR 18 is connected to the PR 21 of the fourth stage.

The output end of the PR 19 is connected to the input end of the selector 23. A plurality of branched addresses read from the second storage circuit 11b are supplied to the selector 23.

In the present embodiment in which the 4-way set associative system is used, the output end of the PR 20 is connected to one of two input ends of each of four comparators 22a to 22d. The other input ends of the comparators 22a to 22d are connected to the output end of the PR 21. The output ends of the comparators 22a to 22d are connected to the selector 23. Each of the comparators 22a to 22d compares a tag of a plurality of branching instructions read from the first storage circuit 11a with the corresponding part (tag) of the address supplied from the program counter 13. As a result, with agreement of both tags, a coincidence signal is output via the output end of one comparator in which the tags agree with each other. In response to the coincidence signal, the selector 23 selects the branched address of the branching instruction corresponding to the program counter 13 stored in the second storage circuit 11b of the first table 11. The selected branched address BA2 is supplied to the selector 15 and second table 12 via a pipeline register 24 disposed in the fifth stage T. Furthermore, a pipeline register 25 is disposed in the fifth stage T. The pipeline register 25 is connected to the pipeline register 21, and holds the value of the program counter 13 output from the pipeline register 21. The value PCT of the program counter 13 output from the pipeline register 25 is supplied to the second table 12.

Figure 2:
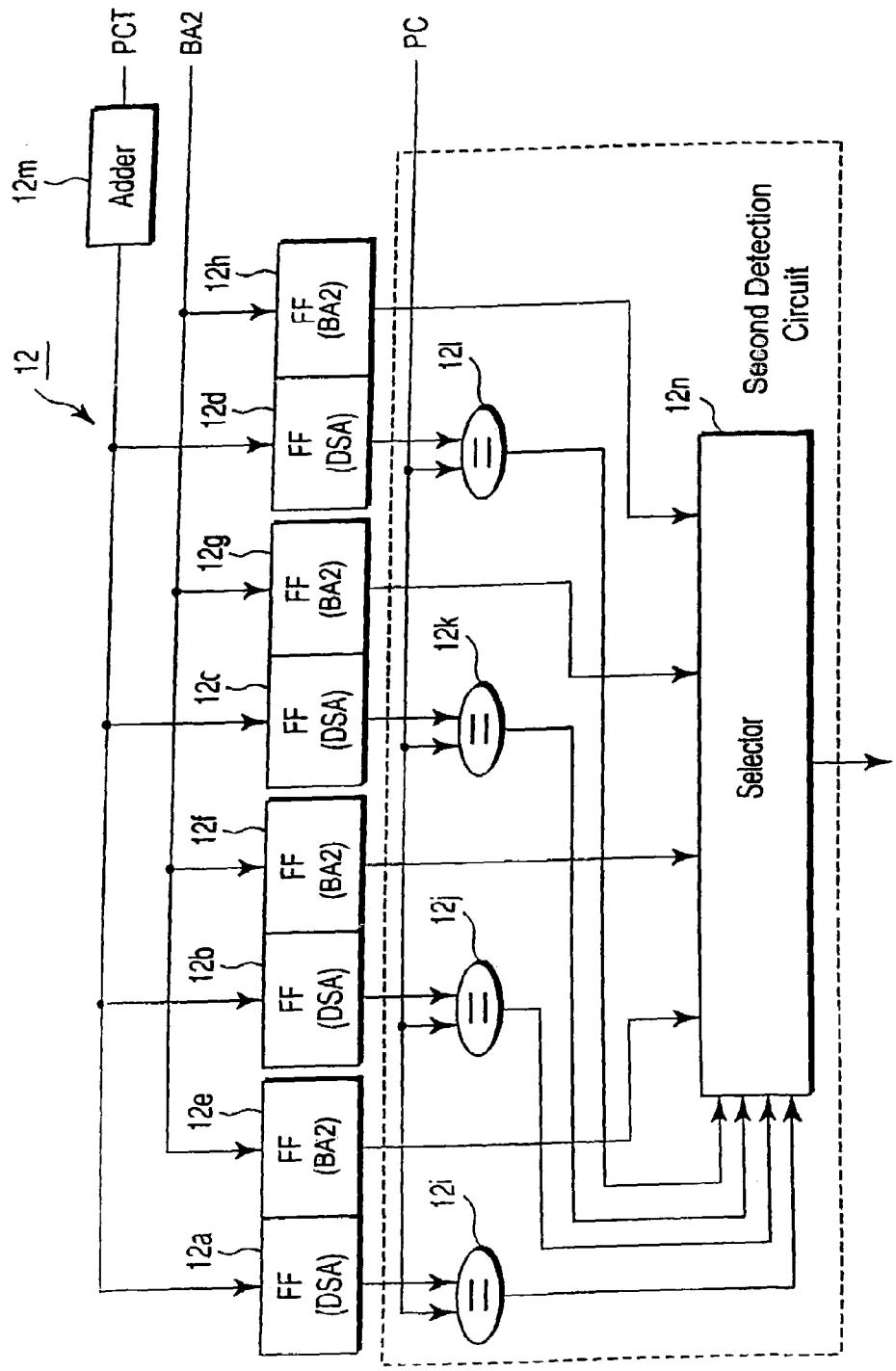
FIG. 2 is a constitution diagram showing one example of a second storage unit shown in FIG. 1.

FIG. 2 shows one example of the second table 12. As described above, the second table 12 has, for example, four entries. Each entry is constituted, for example, of flip-flop circuits (FF) 12a to 12d, and flip-flop circuits 12e to 12h. The flip-flop circuits (FF) 12a to 12d store addresses (DSA) of delay slots (instructions which are executed immediately after the branching instruction and unrelated to the branching instruction). The flip-flop circuits 12e to 12h store the branched addresses (BA) corresponding to the branching instructions. For example, an adder 12m adds a predetermined value to the address PCT supplied from the pipeline register 25, so that the address of the delay slot is generated. A method of generating the address of the delay slot will be described later.

The respective output ends of the flip-flop circuits 12e to 12h are connected to the input end of a selector 12n. Each of the output ends of the flip-flop circuits 12a to 12d is connected to one of the input ends of each of comparators 12i to 12l. The address PC output from the program counter 13 is supplied to the other input ends of the comparators 12i to 12l. Each of the comparators 12i to 12l compares the address PC supplied from the program counter 13 with the address supplied from each of the flip-flop circuits 12a to 12d, and outputs a coincidence signal, when the addresses agree with each other. The coincidence signal is supplied to the selector 12n. In response to the coincidence signal output from any one of the comparators 12i to 12l, the selector 12n selects the branched address of the corresponding branching instruction. The comparators 12i to 12l and selector 12n constitute the second detection circuit.

An operation of the branch prediction circuit will next be described with reference to FIG. 3.

Figure 3:
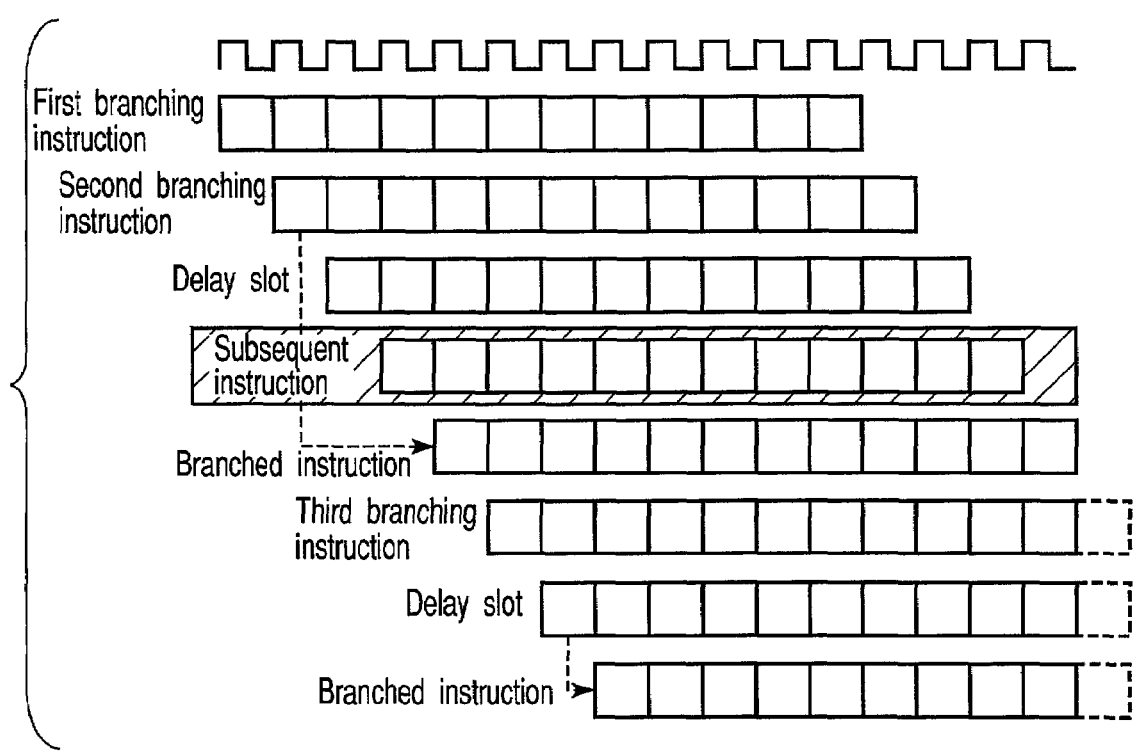
FIG. 3 is a diagram showing an operation of FIGS. 1 and 2.

FIG. 3 shows an example in which the branched address returns to the address before the branching instruction, so that a history of branching can easily be described. That is, this program is defined, for example, as follows A: nop
B: bne $1, $0, A . . . (branching instruction)
C: sub1 $1, $1, 1 . . . (delay slot)

First, when the address of the program counter 13 first becomes the address of the branching instruction shown by A in FIG. 3, nothing is registered in the first and second storage units 11, 12 yet. Therefore, the branching instruction of address B cannot be predicted. Therefore, the branching instruction advances to the end of the pipeline and changes to the branched address A.

Moreover, when this first branching instruction is generated, the address B of the branching instruction and the branched address A of the branching instruction are stored in the first table 11 shown in FIG. 1. That is, a part of the address B of the branching instruction is stored as the tag in the first storage circuit 11a, and the branched address A of the branching instruction is stored in the second storage circuit 11b.

Subsequently, when the address of the program counter 13 becomes the address B of the branching instruction for the second time, the information is already recorded in the first table 11. Therefore, the address B supplied from the program counter 13 and the address B stored in the first table 11 are hit, and the stored branched address A corresponding to the address B is read out.

That is, the address B output from the program counter 13 is supplied to the PRs 16, 17, 18 in response to a clock signal. The present embodiment shows the 4-way set associative system. Therefore, in accordance with a part of the address B, the first storage circuit 11a of the first table 11 reads out four tags and the second storage circuit 11b reads out four addresses. Each of the comparators 22a to 22d compares the tag supplied from the first storage circuit 11a with a part (tag) of the address B supplied from the program counter 13 via the PRs 18, 21. As a result, if the address B corresponds to the branched address registered in the first storage circuit 11a, any one of the comparators 22a to 22d outputs the coincidence signal. In response to the coincidence signal, the selector 23 selects the read branched address A corresponding to the address B of the branching instruction. The branched address A output from the selector 23 is supplied to the selector 15 through the PR24. The branched address A is supplied to the program counter 13. Thereafter, the instruction of the branched address is executed.

With the second branching instruction, the first table 11 is searched and the branched address A is obtained. The branched address A is obtained three cycles after the value of the program counter 13 indicates the address B of the branching instruction.

On the other hand, when the first table 11 is hit in this cycle, the data regarding the branching instruction is stored in the second table 12. In this case, the branched address A is stored corresponding to an address C of the delay slot subsequent to the branching instruction.

As shown in FIG. 2, in the present embodiment, the second table 12 has four entries. The entry to be used is determined from four entries using algorithms such as Least Recently Used (LRU) and Least Recently Filled (LRF). In the present embodiment, it is assumed that the leftmost entry shown in the drawing is selected. For this, the address C of the delay slot following the branching instruction is stored in the flip-flop circuit 12a. Moreover, the flip-flop circuit 12e stores the branched address A. For example, the adder 12m adds "1" to the value PCT of the program counter 13 supplied from the pipeline register 25 and generates the address C of the delay slot.

Subsequently, in the third branching instruction, when the program counter 13 outputs the address C of the delay slot following the branching instruction, the second table 12 is used to execute the branch prediction. That is, the comparators 12i to 12l constituting the second table 12 compare the addresses of the delay slots supplied from the flip-flop circuits 12a to 12d with the address C. In this case, the comparator 12i outputs the coincidence signal. The coincidence signal is supplied to the selector 12n. Therefore, the selector 12n selects the branched address A supplied from the flip-flop circuit 12e in response to the coincidence signal. The branched address A output from the selector 12n is supplied to the program counter 13 via the selector 15 shown in FIG. 1.

As described above, the operation of reading out the branched address A from the second table 12 is executed in one cycle of the clock signal. Therefore, the branching instruction can be executed in a state in which there are no ineffective cycles. Thereafter, even when the branching instruction is executed again, the operation is executed similarly as described above. Therefore, the branching instruction is executed without any ineffective cycles.

The second table 12 has a function of avoiding the ineffective cycles generated during the access to the large-capacity first table 11 as in the operation of the second branching instruction.

Additionally, when the address of the branching instruction is hit, the first table 11 generates the branched address. However, for example, when a cache mistake is generated, ineffective cycles are sometimes disposed between the branching instruction and the delay cycle depending on conditions of instruction supply. In this case, it is essentially necessary to perform the branching processing using the first table 11 with the delay slot. However, as described above, the second table 12 generates the branched address by the address of the delay slot. Therefore, the branching occurs in the first table 11, the information is reflected in the second table 12, and the branch prediction is performed by the address of the subsequent delay slot. Therefore, even when a cache mistake is generated, the branched address can securely be generated at high speed after the refilling of the cache.

Figure 4:
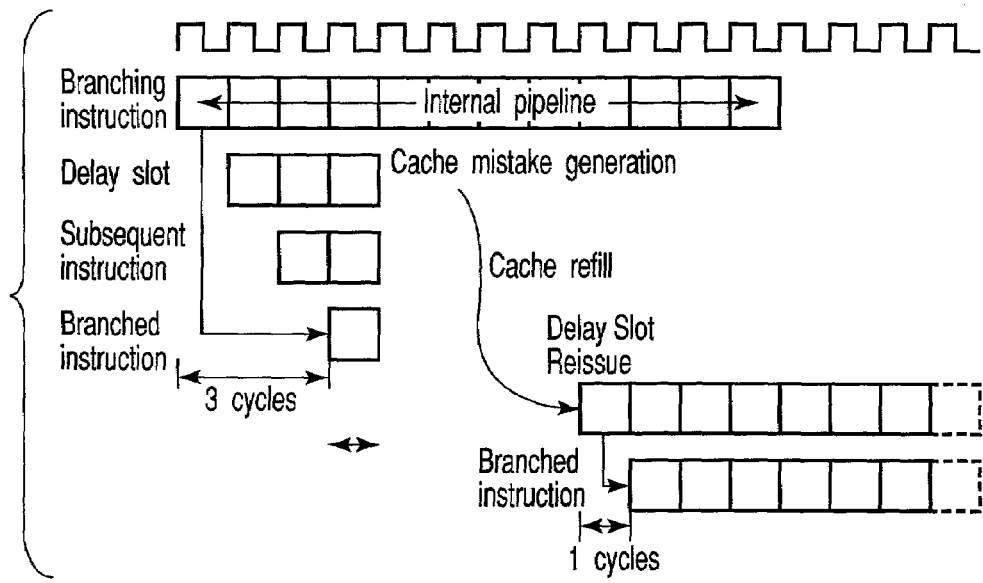
FIG. 4 is a diagram showing another operation of FIGS. 1 and 2.
Figure 5:
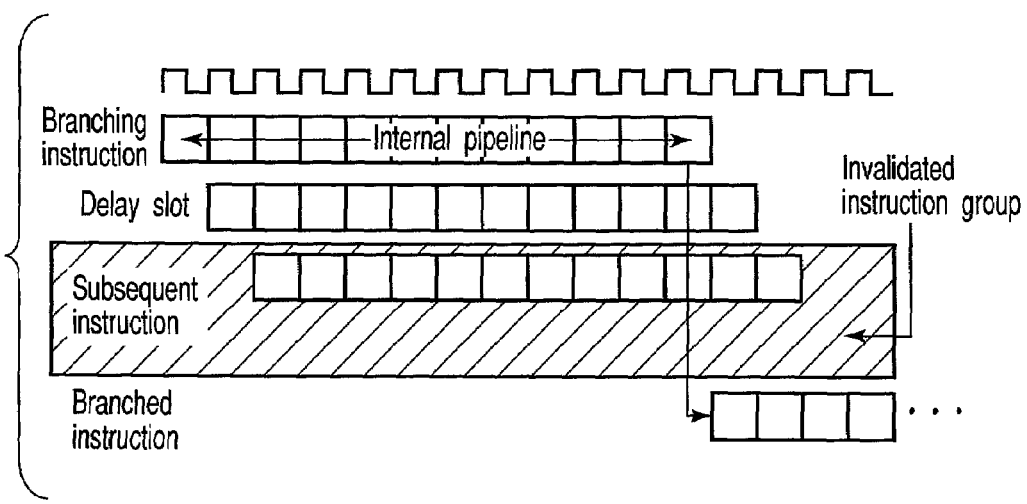
FIG. 5 is a diagram showing the operation during generation of a branching instruction in a conventional microprocessor.
Figure 6:
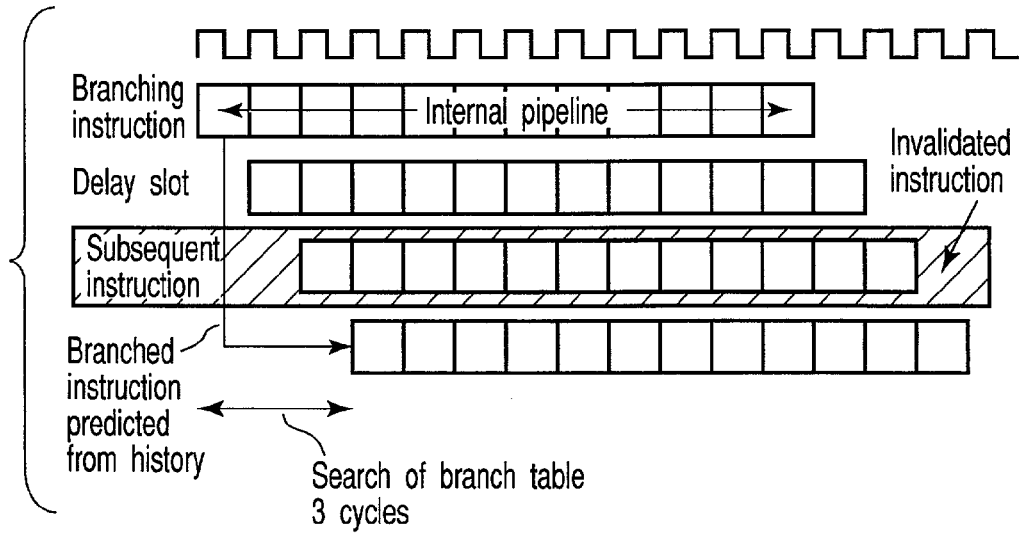
FIG. 6 is a diagram showing a conventional branch prediction operation.
Figure 7:
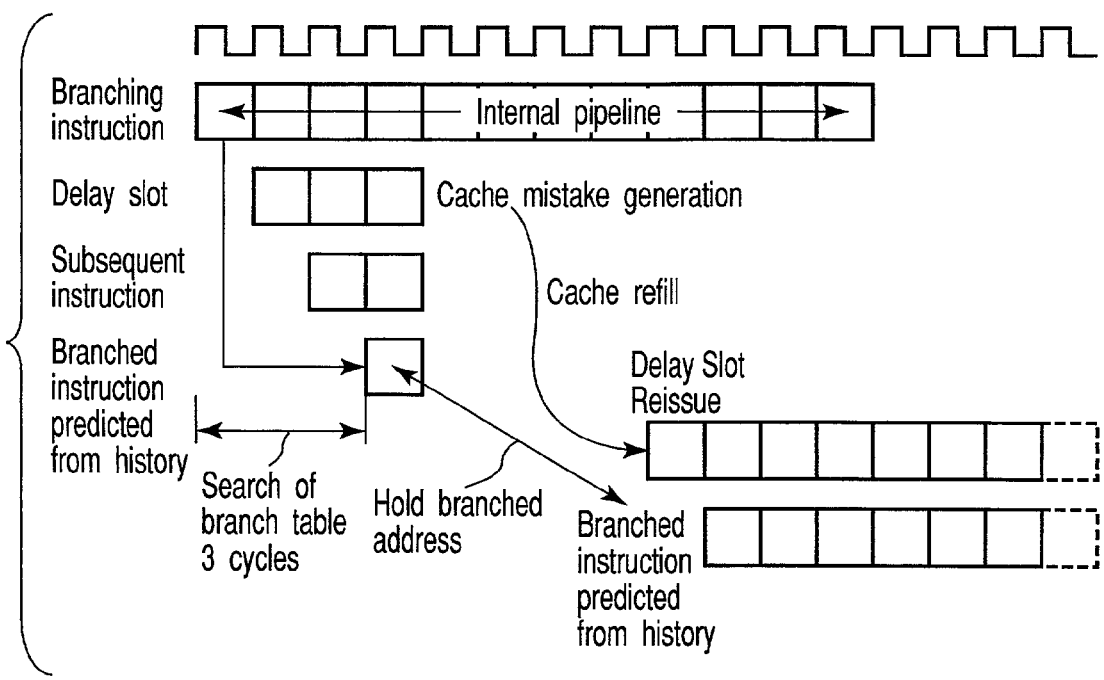
FIG. 7 is a diagram showing the branch prediction operation during generation of a cache mistake.

Furthermore, as shown in FIG. 4, even when a cache mistake is generated during execution of the delay cycle, the branch prediction circuit can securely operate. That is, when the branching instruction is issued, the branched address is predicted during the execution of the delay slot following the branching instruction. Assuming that the first table 11 stores the branching instruction and branched address, the prediction requires three cycles as described above. Moreover, the predicted branched address is stored corresponding to the address of the delay slot in the second table 12. When the cache mistake is generated during execution of the delay slot, the cache is refilled. When the refilling of the cache ends and the delay cycle is reissued, the second table 12 is used to predict the branched address. Therefore, the branched address can quickly be read from the address of the reissued delay slot. Therefore, even when the cache mistake is generated during execution of the delay slot as in the conventional method, a stall control for holding the pipeline is unnecessary. Therefore, the control can be further simplified.

In the above embodiment, after the first table 11 is updated, and the next branching occurs, the second table 12 is registered/updated. This example has been described. However, in a first branching, the first and second tables 11, 12 may simultaneously be registered/updated. In this case, it is sometimes necessary to increase the capacity of the second table 12. However, when the capacities of the first and second tables 11, 12 are appropriately set, an optimum constitution can be obtained.

According to the above-described embodiment, the first table 11 stores the branched address corresponding to the address in which the branching instruction is present, and the second table 12 stores the branched address of the branching instruction in accordance with the address of the delay slot following the branching instruction. Therefore, with the address of the branching instruction, the branched address can be output from the second table 12 at high speed in accordance with the address of the delay slot. Therefore, the number of invalidated instructions can be reduced even in the microprocessor which has a wide memory bus and runs at a high operation frequency.

Moreover, when the branching instruction stored in the first table 11 is hit, the second table 12 stores the branched address corresponding to the branching instruction in accordance with the address of the delay slot. Therefore, since the frequently executed branching instruction is stored in the second table 12 in the program, the branching instruction can be executed at high speed, and the speed of the whole processing can be raised.

Additionally, the second table 12 is constituted of memories such as flip-flop circuits which have a small capacity and enable high-speed operation compared with the first table 11. Therefore, the frequently executed branching instruction can be processed at higher speed.

Furthermore, the second table 12 stores the branched address corresponding to the branching instruction in accordance with the address of the delay slot. Therefore, when a cache mistake is generated in the delay slot, the cache is refilled, the delay slot is reissued, and the address can quickly shift to the branched address. Therefore, the branched address can securely be generated with a simple circuit constitution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A branch prediction circuit comprising:
a program counter to indicate an address of an instruction;
a first storage unit provided in a stage after the program counter and configured to store the address of a first branching instruction and a branched address branched to by said first branching instruction;
a first detection circuit provided in a stage after the first storage unit and configured to detect whether the address of the first branching instruction stored in the first storage unit is the same as an address of a second branching instruction output from the program counter, and if so, to output the branched address corresponding to the detected address from the first storage unit;
a second storage unit configured to store the branched address supplied from said first detection circuit and an address of an instruction which is unrelated to the second branching instruction and executed immediately after said second branching instruction; and
a second detection circuit provided in the same stage as the second storage unit and configured to detect the branched address from said second storage unit, wherein when an address output from said program counter is the address of an instruction to be executed immediately after a third branching instruction, the branched address detected by the second detection circuit is supplied to the program counter.

2. The circuit according to claim 1, wherein said second storage unit, said second detection circuit, said program counter, said first storage unit, and said first detection circuit are connected in series.

3. The circuit according to claim 2, wherein said second storage unit stores said branched address, after the address of the second branching instruction and the branched address are stored in said first storage unit.

4. The circuit according to claim 1, wherein a storage capacity of said first storage unit is larger than a storage capacity of said second storage unit.

5. The circuit according to claim 4, wherein said first storage unit comprises:
a first storage circuit which stores a part of the address of said first branching instruction output from said program counter as a tag; and
a second storage circuit which stores the branched address in accordance with said second branching instruction.

6. The circuit according to claim 5, wherein said first detection circuit comprises:
a plurality of comparison circuits which compare a plurality of tags output from said first storage circuit with the corresponding part of the address supplied from said program counter; and
a first selector which selects the branched address output from said second storage circuit in response to output signals of the plurality of said comparison circuits.

7. The circuit according to claim 6, wherein said first and second storage circuits comprise static RAMs.

8. The circuit according to claim 5, wherein said second detection circuit comprises:
a third storage circuit to store the address of the instruction executed immediately after said second branching instruction;
a fourth storage circuit to store said branched address in accordance with said third storage circuit; and
wherein said second detection circuit comprises:
a comparison circuit to compare the present address supplied from said program counter with the address of the instruction executed immediately after said second branching instruction stored in said third storage circuit; and
a first selector to select the branched address stored in said fourth storage circuit, when both addresses agree with each other as a result of the comparison by said comparison circuit.

9. The circuit according to claim 8, wherein said third and fourth storage circuits comprise flip-flop circuits.

10. The circuit according to claim 8, wherein the instruction executed immediately after the branching instruction is a delay slot.

11. The circuit according to claim 1, wherein the branched address stored in the first storage unit corresponds to the address of the branching instruction; and wherein the branched address of the branching instruction stored in the second storage unit corresponds to an address next to the address of the branching instruction.

12. A branch prediction method comprising:

detecting whether an address of a first branching instruction stored in a first storage unit is the same as the address of a second branching instruction output from a program counter;

reading a branched address branched to by said first branching i nstruction from the first storage unit when it is detected that the address of the first branching instruction stored in the first storage unit is the same as the address of the second branching instruction output from the program counter;

storing the read branched address in a second storage unit in accordance with the address of an instruction executed immediately after said second branching instruction, wherein the second storage unit is provided before a stage including the first storage unit; and detecting the branched address corresponding to the address of the instruction executed immediately after the second branching instruction from the second storage unit, wherein when the program counter outputs an address of the instruction executed immediately after a third branching instruction, the branched address detected by the second storage unit is supplied to the program counter.

13. The method according to claim 12, further comprising:

detecting said branched address corresponding to the address of the instruction executed immediately after said branching instruction by said second storage unit when the address output from said program counter is the address of the instruction executed following said branching instruction.

14. The method according to claim 12, further comprising:

detecting said branched address corresponding to the address of the instruction executed immediately after said branching instruction by said second storage unit when a cache miss is generated during execution of the instruction immediately after said branching instruction, the detection being executed after a cache is refilled.

15. The method according to claim 12, wherein said second storage unit stores said branched address after the address of the second branching instruction and the branched address are stored in said first storage unit.

16. The method according to claim 12, wherein a storage capacity of said first storage unit is larger than a storage capacity of said second storage unit.

17. The method according to claim 16, wherein said second storage unit comprises a flip-flop circuit.

18. The method according to claim 16, wherein said second storage unit is disposed in a stage before said first storage unit.

19. The method according to claim 12, wherein said first storage unit comprises a static RAM.

20. The method according to claim 12, further comprising:

storing the branched address in the first storage unit in correspondence to the address of the branching instruction; and storing the branched address of the branching instruction in the second storage unit in correspondence to an address next to the address of the branching instruction.

* * * * *